United States Patent
Redford et al.

(10) Patent No.: US 8,140,732 B2
(45) Date of Patent: *Mar. 20, 2012

(54) CABIN TELECOMMUNICATION UNIT

(75) Inventors: Stephen Redford, Naperville, IL (US); Steven Murakami, Chicago, IL (US); David Zahalka, Warrenville, IL (US); James Dubois, Lockport, IL (US)

(73) Assignee: GTE Wireless Incorporated, Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/707,070

(22) Filed: Feb. 17, 2010

(65) Prior Publication Data
US 2010/0146184 A1 Jun. 10, 2010

Related U.S. Application Data

(63) Continuation of application No. 10/241,723, filed on Sep. 11, 2002, now Pat. No. 7,689,752.

(51) Int. Cl.
G06F 13/14 (2006.01)
G06F 13/00 (2006.01)
G08B 21/00 (2006.01)

(52) U.S. Cl. .......... 710/305; 710/100; 340/945
(58) Field of Classification Search .......... 710/305, 710/100; 340/945
See application file for complete search history.

(56) References Cited

U.S. PATENT DOCUMENTS

| 3,704,845 A | 12/1972 | Ord |
| 4,788,531 A * | 11/1988 | Corwin et al. ............ 340/945 |
| 5,029,209 A * | 7/1991 | Strong et al. ............ 370/255 |
| 5,553,135 A * | 9/1996 | Xing ............ 379/399.01 |
| 5,568,484 A * | 10/1996 | Margis ............ 370/452 |
| 5,622,506 A * | 4/1997 | Hornig et al. ............ 439/74 |
| 5,724,520 A * | 3/1998 | Goheen ............ 705/5 |
| 5,742,336 A | 4/1998 | Lee |
| 5,809,525 A * | 9/1998 | Bishop et al. ............ 711/122 |
| 5,835,127 A | 11/1998 | Booth et al. |
| 5,926,759 A * | 7/1999 | Severwright ............ 455/431 |
| 5,963,877 A | 10/1999 | Kobayashi |
| 5,966,442 A | 10/1999 | Sachdev |
| 5,973,722 A * | 10/1999 | Wakai et al. ............ 725/76 |
| 6,058,288 A * | 5/2000 | Reed et al. ............ 455/3.06 |
| 6,104,926 A * | 8/2000 | Hogg et al. ............ 455/431 |
| 6,201,797 B1 | 3/2001 | Leuca et al. |

(Continued)

FOREIGN PATENT DOCUMENTS

EP 1052790 A1 * 11/2000

(Continued)

OTHER PUBLICATIONS

Wargo, C.A.; D'Arcy, J.-F.; , "Performance of data link communications in surface management operations," Aerospace Conference, 2011 IEEE , pp. 1-10, Mar. 5-12, 2011.*

(Continued)

*Primary Examiner* — Faisal M Zaman

(57) ABSTRACT

A cabin telecommunications unit that provides combined telephone and entertainment/information services onboard an aircraft. The includes a central data bus for exchanging data between components of the cabin telecommunication unit; a first processor connected to said central data bus for processing a communication received by the cabin telecommunication unit and directing the communication to a destination point within the cabin; and a second processor connected to said central data bus for processing and responding to requests for data stored within said cabin telecommunications unit.

14 Claims, 3 Drawing Sheets

U.S. PATENT DOCUMENTS

| | | | |
|---|---|---|---|
| 6,249,913 B1 | 6/2001 | Galipeau et al. | |
| 6,287,201 B1 | 9/2001 | Hightower | |
| 6,300,875 B1 | 10/2001 | Schafer | |
| 6,338,041 B1 * | 1/2002 | Kawamata | 705/5 |
| 6,385,513 B1 | 5/2002 | Murray et al. | |
| 6,563,418 B1 | 5/2003 | Moon | |
| 6,584,326 B1 * | 6/2003 | Boydston et al. | 455/558 |
| 6,614,126 B1 * | 9/2003 | Mitchell | 307/9.1 |
| 6,631,159 B1 | 10/2003 | Morris | |
| 6,671,589 B2 * | 12/2003 | Holst et al. | 701/3 |
| 6,681,972 B1 * | 1/2004 | Tapocik | 224/602 |
| 6,684,282 B1 | 1/2004 | Kocis | |
| 6,799,155 B1 * | 9/2004 | Lindemann et al. | 703/24 |
| 6,801,907 B1 | 10/2004 | Zagami | |
| 6,813,777 B1 * | 11/2004 | Weinberger et al. | 725/76 |
| 7,171,369 B1 | 1/2007 | Bertram et al. | |
| 7,502,746 B2 | 3/2009 | Bertram et al. | |
| 7,689,752 B1 * | 3/2010 | Redford et al. | 710/305 |
| 2002/0003571 A1 | 1/2002 | Schofield et al. | |
| 2002/0160773 A1 * | 10/2002 | Gresham et al. | 455/431 |
| 2003/0027551 A1 | 2/2003 | Rockwell | |
| 2003/0037187 A1 | 2/2003 | Hinton et al. | |
| 2003/0052798 A1 | 3/2003 | Hanson | |
| 2003/0128123 A1 | 7/2003 | Sumiya et al. | |
| 2004/0199411 A1 | 10/2004 | Bertram et al. | |
| 2004/0263621 A1 | 12/2004 | Guo et al. | |
| 2005/0029346 A1 | 2/2005 | Byrne et al. | |

FOREIGN PATENT DOCUMENTS

| | | | |
|---|---|---|---|
| FR | 2920931 A1 * | 3/2009 | |
| JP | 01273192 A * | 11/1989 | |
| JP | 11232355 | 8/1999 | |
| JP | 2002342645 | 11/2002 | |
| JP | 2004005112 A * | 1/2004 | |
| JP | 2006033564 | 2/2006 | |
| JP | 2007135039 | 5/2007 | |
| JP | 2008171324 A * | 7/2008 | |
| WO | WO 9826521 A1 * | 6/1998 | |
| WO | WO/2004/025600 | 3/2004 | |

OTHER PUBLICATIONS

Marinos, D.; Aidinis, C.; Schmitt, N.; Klaue, J.; Schalk, J.; Pistner, T.; Kouros, P.; , "Wireless optical OFDM implementation for aircraft cabin communication links," Wireless Pervasive Computing (ISWPC), 2010 5th IEEE International Symposium on , pp. 465-470, May 5-7, 2010.*

De Santis, V.; Feliziani, M.; Ocera, G.; , "Revealing system of GSM mobile phone operations aboard aircraft," Electromagnetic Compatibility—EMC Europe, 2008 International Symposium on , pp. 1-6, 8-12 Sep. 2008.*

Hyland, Frederick; , "Communication control in modern aircraft," Electronics and Power , vol. 20, No. 7, pp. 280-283, Apr. 18, 1974.*

Folden et al., "An Aircraft Cabin Wireless System for Games and Video Entertainment", Jan. 2007, ACM, Computers in Entertainment (CIE), vol. 5, Issue 1, pp. 1-17.

Sanchez-Puebla et al., "A New Approach for Distributed Computing in Avionics Systems", Sep. 2003, Trinity College Dublin, Proceedings of the 1st International Symposium on Information and Communication Technologies, vol. 49, pp. 579-584.

Thanthry, N.; Pendse, R., "Aviation data networks: security issues and network architecture," Security Technology, 2004. 38th Annual2004 International Carnahan Conference on , vol., No., pp. 77-81, Oct. 11-14, 2004.

"ANSI/IEEE Std 802.5-1998E(R2003), Part 5: Token ring access method and Physical Layer specifications", May 26, 1998, IEEE Computer Society, pp. 105-107.

* cited by examiner

CABIN TELECOMMUNICATION UNIT

CROSS REFERENCE TO RELATED APPLICATIONS

This application is a continuation of U.S. patent application Ser. No. 10/241,723, filed on Sep. 11, 2002, which is hereby incorporated by reference in its entirety.

FIELD OF THE INVENTION

The present invention relates to a cabin telecommunications unit for an aircraft, and, more specifically, a cabin telecommunications unit with the capability of functioning as a file server.

BACKGROUND OF THE INVENTION

Today's commercial airline carriers typically provide a variety of services to enhance the comfort of and provide convenience to their passengers. One such service is access to a telephone, often provided right at the passenger's seat. This allows passengers to not only communicate with other passengers without having to get out of their seat, but also provides the ability for a passenger to initiate and receive telephone calls to virtually anywhere in the world. Telephone access also provides the passenger with means to connect their laptop or portable computer to a service provider and the Internet, thereby allowing them to perform functions such as checking their email and dispatching faxes.

Many commercial airlines are also equipping their aircraft to provide onboard entertainment and information services that a passenger can access either at their seat or at designated areas within the plane. Access to these services are either through a dedicated computing device provided by the airline, or alternatively, by the passenger's own laptop or portable computer.

To provide the above services typically requires two or more separate devices located within the aircraft. A cabin telecommunications unit (CTU) is the device responsible for receiving telephony information from a cabin-based telephone system, and relaying that information to either other parts of the aircraft, or to the aircraft's transmitter/receiver, thereby allowing telephone calls to or from the aircraft to connect with the ground-based telephone network. The communications protocol to which the CTU and cabin-based telephone system are often designed to comply with is the Aeronautical Radio, Inc, protocol 746 (ARINC 746).

Similarly, a file server (FS) device is required to provide computerized services such as onboard entertainment and information services. Typical file servers are stand alone devices that incorporate a microprocessor with short term and long term memory, along with various interfaces and switching means for directing and processing digital signals. Standard file server devices designed for use in aircraft are often designed to comply with ARINC 763 protocol.

FIG. 1 is a simplified depiction of a CTU and a PS provided onboard an aircraft. As illustrated, contained within the cabin 100 of an aircraft is a plurality of seats 110 for the passengers. A CTU 200 and a FS 300 are also contained within the cabin 100 (depicted) or, alternatively, in another area of the aircraft (not depicted). Wiring 210 is laid throughout the cabin to connect the CTU 200 to a plurality of telephone handsets 220 distributed throughout the cabin 100, typically at each of the passenger seats 110. Similarly, wire 310 is also laid to connect FS 300 to a plurality of dedicated access devices (not shown) or to a plurality of access points 320 for interfacing with a portable computing device such as a laptop computer 330.

One disadvantage with the traditional system, such as that presented in FIG. 1, is the need to have both the CTU and a FS in order to provide the above passenger services. Both devices take up space within and add to the overall weight of the aircraft, thereby utilizing valuable resources of an aircraft to which airlines would rather allocate to other profit generating purposes. Furthermore, separate power sources are often needed for each of the devices, leading to increased costs and greater loss of space upon the aircraft. Additionally, the presence of two separate devices typically requires the aircraft to be wired for both, thereby further increasing the labor and costs involved in providing telephone and onboard entertainment and information services.

Therefore, the inventors hereof have recognized the need for a new apparatus for providing both telephone and entertainment/information services onboard an aircraft.

SUMMARY OF THE INVENTION

The present invention relates to a cabin telecommunications unit that provides combined telephone and entertainment/information services onboard an aircraft. The inventive apparatus includes a central data bus for exchanging data between components of the cabin telecommunication unit; a first processor connected to said central data bus for processing a communication received by the cabin telecommunication unit and directing the communication to a destination point within the cabin; and a second processor connected to said central data bus for processing and responding to requests for data stored within said cabin telecommunications unit.

DESCRIPTION OF THE PREFERRED EMBODIMENT

Figure 1:
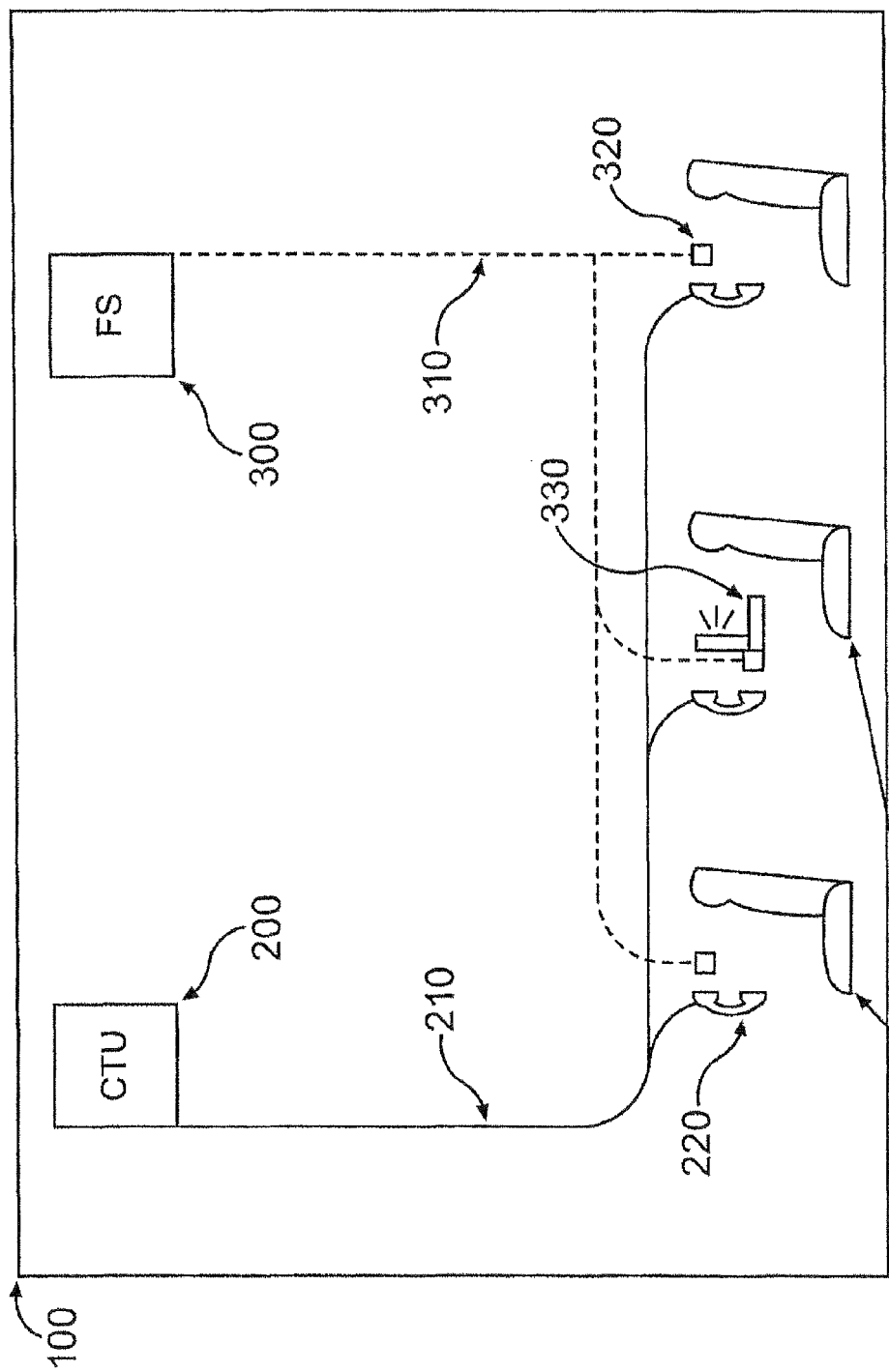
FIG. 1 is a simplified depiction of a typical aircraft cabin that includes a cabin telecommunications unit and a file server, with their respective wiring to each of the passenger seats.
Figure 2:
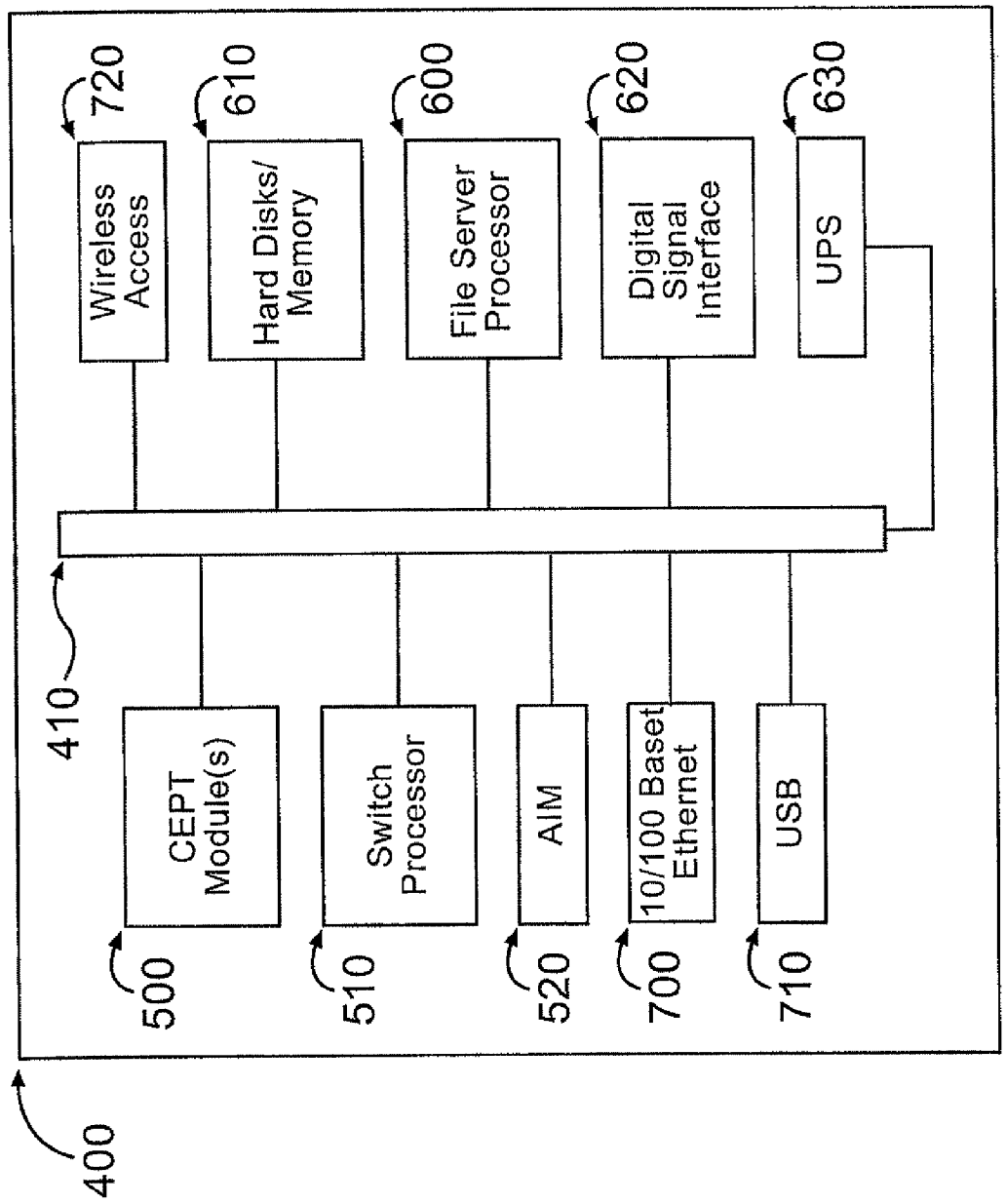
FIG. 2 is a simplified depiction of the basic components that comprise a cabin telecommunications unit according to one embodiment of the present invention.

FIG. 2 illustrates a cabin telecommunications unit (CTU) 400, and some of the components it is comprised of, according to one embodiment of the present invention. All components of the CTU 400 connect either directly or indirectly to a central or backplane bus 410, which allows the various components to communicate with one another.

One or more multichannel digital telephone interface modules (CEPT Modules) 500 connect the CTU 400 to one or more main communication lines. According to this embodiment, the main communications lines are E1 high speed data lines, the European equivalent to North American T1 communication lines but based on a digital transmission format from the Conference of European Postal and Telecommunication Administration (CEPT). The CEPT modules 500 link the CTU 400 to the E1 line or lines, which are distributed throughout the cabin, connecting the passenger telephone handsets 220 and access points 320 to the CTU 400. If an alternative type of communication line is used in place of an E1 line, CEPT module 500 can simply be replaced with a similar functioning interface module designed to work the different type of line.

A switch processor 510 serves as the "brains" of the CTU 400, directing data entering the CTU 400 to the appropriate components at the appropriate time and coordinating the operation of the various components making up the CTU 400.

An aircraft interface module (AIM) 520 monitors different aspects and states of the aircraft and relays that data to the CTU 400. For example, one monitoring function of AIM 520 can be a "weight on wheels" assessment which aides in the determination of whether the aircraft is currently airborne or on the ground. Based on this and other such assessments, CTU 400 can appropriately determine the conditions that exist throughout the aircraft and tailor its actions accordingly. For instance, through AIM 520, it is determined that the aircraft has landed and passenger details allowing incoming calls to be directed to specific seats are cleared in readiness for the next flight carrying new passengers.

In addition to its communication abilities, CTU 400 also contains several components that provide it with the ability to function as a file server (FS), allowing additional services to be provided to the passengers and airline personnel. Some of these components include a file server processor 600, memory 610, and one or more digital signal interface units 620.

FS processor 600 can be any type of computer microprocessor, such as, for example, an Intel Pentium or other compatible personal computer processor, capable of running an operating system such as Linux or Microsoft Windows 2000. Included with FS processor 600 is a sufficient amount of temporary memory, such as random access memory (RAM), for FS processor 600 to function appropriately. Program and data storage is accomplished by one or more hard disk drives 610 that are accessible by FS processor 600. Communication between the hard disk drive(s) 610 and FS processor 600 is carried out using standard IDE connections. If two or more hard disk drives are present, the individual drives can be arranged into a redundant RAID array, thereby assuring the existence of at least one backup copy of the data.

One or more digital signal interface units 620, such as, for example, a bank of modulator/demodulaters (modems), is provided to process and convert into the appropriate format those signals that pass through the CEPT module 500 and are designated to continue on to the FS processor 600.

An uninterruptible power supply (UPS) 630 assures that FS processor 600 and the other components of CTU 400 are powered by the aircraft with the appropriate voltage, which is obtained by the use of one or more voltage converters. UPS 630 also incorporates one or more rechargeable batteries that will continue to power CTU 400 for a set period of time if the main power supply is interrupted.

One or more 10/100 BaseT Ethernet interfaces 700, and/or one or more universal serial bus (USB) interfaces 710 can be incorporated into CTU 400 to provide additional means of communicating data to and from CTU 400, The USB interface 710 allows for a quick connection to be made to the CTU 400 without having to go through the E1 or main communication lines. The 10/100 BaseT Ethernet interface 700 provides for a high speed connection to CTU 400 when a greater amount of bandwidth compared to that provided by the E1 or main communication lines is desired.

The CTU 400 can also optionally incorporate a wireless access interface 720 that allows the passengers or the crew of the aircraft to access all or certain features of the CTU 400 through a wireless-equipped computing device; such as a handheld or laptop computer. For example, the flight crew could use a wireless handheld device, in conjunction with a database maintained within the CTU 400, to efficiently verify and update passenger seating assignments. Similarly, passengers could readily access a variety of information services, hosted by CTU 400, through their wireless-equipped laptop computer without concerns such as having to physically connect their laptop to the aircraft's network or cable compatibility. Any one of a variety of wireless data transfer standards, such as the widely popular 802.11b wireless communication standard, can be utilized.

In order for switch processor 510 to be able to direct data to the various components discussed above, each of the components must be capable of communicating with the switch processor 510, which requires that each of the components possess an identification code or address. Switch processor 510 can then appropriately direct data to the proper component by labeling blocks of data with the identification code or address of the appropriate component.

How the cabin telecommunications unit 400 works will now be described with reference to some general examples. In a first example, if a first passenger onboard an aircraft in flight wanted to talk to a second passenger sitting in another portion of the aircraft, the first passenger can pick up the telephone handset located at his or seat and enter the appropriate information to indicate the desired destination of the call. The data representing the call travels through the main communication line, which in this example, is an E1 line, toward the cabin telecommunication unit 400. The CEPT module 500 retrieves the data from the E1 line and forwards it to switch processor 510. The switch processor 510 analyzes the data, determines that it is a passenger phone call directed to another passenger, and reroutes the data back out through the CEPT module 500 to the appropriate telephone handset associated with the seat of the second passenger.

Similarly, if the first passenger wished to make a telephone call to a landline telephone number located on the public switched telephone network, the data would again enter the cabin telecommunication unit 400 by means of CEPT module 500. The data is then delivered to the switch processor 510, which determines through the aircraft interface module 520 that the aircraft is currently airborne. Accordingly, the switch processor 510 redirects the data back out of the cabin telecommunication unit 400 to the aircraft's external communication system, which can include, for example, a transceiver and an antenna that directs the call to a satellite or ground-based communication system.

According to another example, a passenger connects his or her laptop computer to the telephone handset located at their seat, and wishes to access an onboard entertainment and information system provided by the airline. Data representing the call is picked up off the E1 line by the CEPT module 500, where it is then directed to switch processor 510. Upon determining that the data represents a request to access the onboard entertainment and information system, switch processor 510 directs the data to digital signal interface 620, which performs some preliminary processing of the data and then forwards it to FS processor 600. FS processor 600 analyzes the data, determines what information the data is requesting, retrieves the appropriate information from hard disk 610, and then forwards the information to switch processor 510. Upon determining that the data represents an answer to a previous request, switch processor 510 directs the data through CEPT module 500, down an E1 line to the passenger who originated the requesting call.

Figure 3:
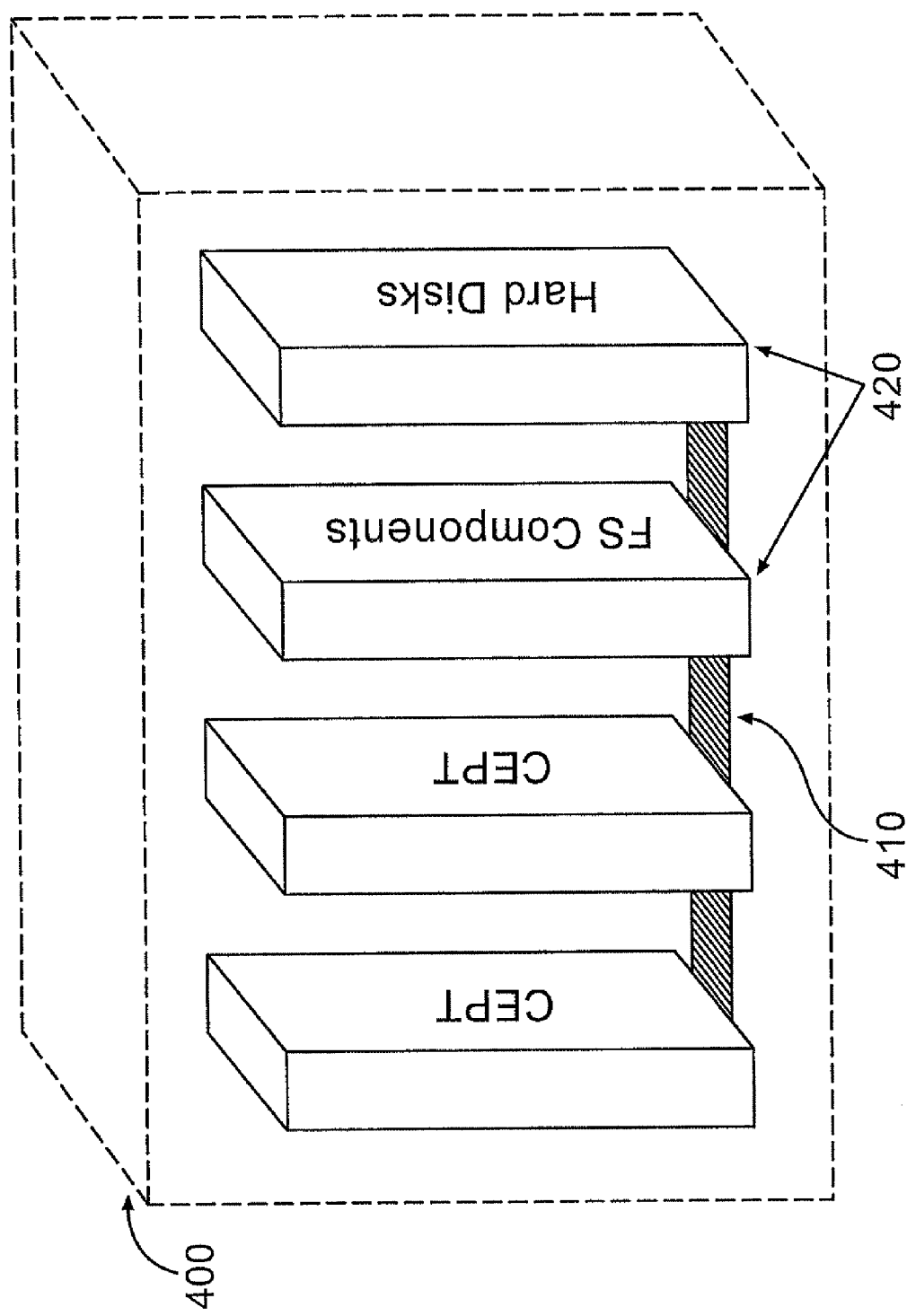
FIG. 3 is a simplified depiction of one possible form of a cabin telecommunications unit according to an embodiment of the present invention.

FIG. 3 is a simplified depiction of a cabin telecommunications unit 400 according to another embodiment of the present invention. The cabin telecommunications unit 400 is comprised in part of two or more modules 420. Each of these modules possess a communication interface (not shown) that inserts or plugs into a receptacle provided within the cabin telecommunication unit 400. The central bus 410 connects each of the receptacles with one another and to other components of the unit. According to the present embodiment, file serving capabilities can then be easily added and modified by inserting one or more modules 420 that are comprised of the necessary components. For example, one module 420 can be comprised of a digital signal interface, computer processor and random access memory while a second module contains one or more hard disks for long term data storage.

While the invention has been specifically described in connection with certain specific embodiments thereof, it is to be understood that this is by way of illustration and not of limitation, and the scope of the appended claims should be construed as broadly as the prior art will permit.

What is claimed is:

1. A system comprising:
   a cabin telecommunication unit, the cabin telecommunication unit including a wireless access interface to allow communication between the cabin telecommunication unit and at least one wireless device within an aircraft; and
   an aircraft interface module in communication with the cabin telecommunication unit and configured to monitor a plurality of conditions of the aircraft;
   wherein the aircraft interface module is configured to determine whether the aircraft is airborne or on the ground based on the plurality of conditions;
   wherein the cabin telecommunication unit is configured to clear passenger details in response to the determined state of the aircraft;
   the determined state being that the aircraft has landed.

2. A system as set forth in claim 1, wherein the aircraft interface module is configured to monitor whether the aircraft is airborne or on the ground by performing a weight on wheels assessment.

3. A system as set forth in claim 1, wherein the cabin telecommunication unit includes the aircraft interface module.

4. A system as set forth in claim 1, wherein the cabin telecommunication unit includes a switch processor and a file server processor in communication with one another.

5. A system as set forth in claim 4, wherein the cabin telecommunication unit includes a communication bus and wherein the aircraft interface module, the switch processor, and the file server processor are in communication with the communication bus.

6. A system as set forth in claim 5, wherein the switch processor is configured to direct data to components of the cabin telecommunication unit via the communication bus.

7. A system as set forth in claim 1, wherein the wireless access interface uses an 802.11 wireless communication standard.

8. A method comprising:
   monitoring, via an aircraft interface module, a plurality of conditions of an aircraft;
   determining, via a cabin telecommunication unit, a state of the aircraft; and
   clearing passenger details based on the determined state of the aircraft; the determined state being that the aircraft has landed.

9. A method as set forth in claim 8, further comprising monitoring, via the aircraft interface module, whether the aircraft is airborne or on the ground.

10. A method as set forth in claim 9, wherein monitoring whether the aircraft is airborne or on the ground includes performing a weight on wheels assessment.

11. A method as set forth in claim 9, further comprising directing data to components of the cabin telecommunication unit via a communication bus.

12. A method as set forth in claim 9, further comprising allowing, via a wireless access interface, wireless communication between the cabin telecommunication unit and at least one wireless device within the aircraft.

13. A system comprising:
    a cabin telecommunication unit having a plurality of components in communication with one another via a communication bus, the components including:
       an aircraft interface module configured to monitor a plurality of conditions of an aircraft, including monitoring whether the aircraft is airborne or on the ground;
       a wireless access interface configured to allow wireless communication between the cabin telecommunication unit and at least one wireless device within the aircraft; and
       a file server processor in communication with the aircraft interface module and the wireless access interface, to provide information to the at least one wireless device;
    wherein the cabin telecommunication unit is configured to determine a state of the aircraft and clear passenger details after determining that the aircraft has landed.

14. The system of claim 13, wherein the wireless access interface uses an 802.11 wireless communication standard.

* * * * *